United States Patent
Wessler

[11] Patent Number: 5,087,111
[45] Date of Patent: Feb. 11, 1992

[54] MAT SELECTION DEVICE

[76] Inventor: Gerald Wessler, 18 Kimball Dr., Gulfport, Miss. 39507

[21] Appl. No.: 346,553

[22] Filed: May 2, 1989

[51] Int. Cl.$^5$ .............................................. G02B 27/02
[52] U.S. Cl. .................................... 359/479; 359/466; 359/894; 434/81
[58] Field of Search ............... 350/319, 252, 255, 115, 350/133, 134, 138, 143, 144, 639, 266; 351/158, 203; 40/158.1, 152.1, 160, 154

[56] References Cited

U.S. PATENT DOCUMENTS

| | | | |
|---|---|---|---|
| 1,194,057 | 8/1916 | Murphy | 350/142 |
| 1,900,557 | 3/1933 | Holcombe | 350/679 |
| 2,261,850 | 11/1941 | Kelly | 351/203 |
| 2,289,467 | 7/1942 | Taylor | 350/138 |
| 2,581,000 | 1/1952 | Copeland | 350/133 |
| 2,951,417 | 9/1960 | Reeder et al. | 350/133 |
| 4,160,581 | 7/1979 | Weissler | 350/133 |
| 4,550,978 | 11/1985 | Friedle | 350/138 |

Primary Examiner—Bruce Y. Arnold
Assistant Examiner—Loha Ben

[57] ABSTRACT

A hand held or table positioned mat selection device (FIG. 1) in which the viewing eyepiece (28) is used to restrict the field of view to a mat or mats (FIG. 13: 40A, 40B and 40C) and their apertures (41C) in a carrier (36) which may be moved forward or backward so as to fill the periphery of the visual field, and with the viewing device aimed at the picture to be matted 20 (FIGS. 9A and 9B) so that the illusion of a mat surrounding a picture (FIG. 11) is created and preserved. The capacity of the mat selection device for monocular viewing (FIG. 3A) and binocular viewing (FIG. 3B) is described.

18 Claims, 8 Drawing Sheets

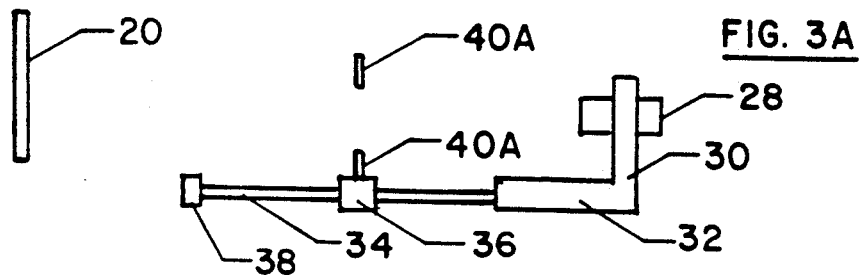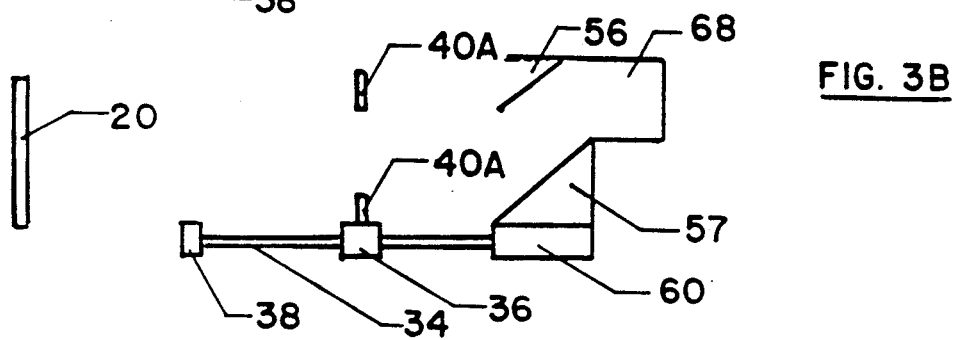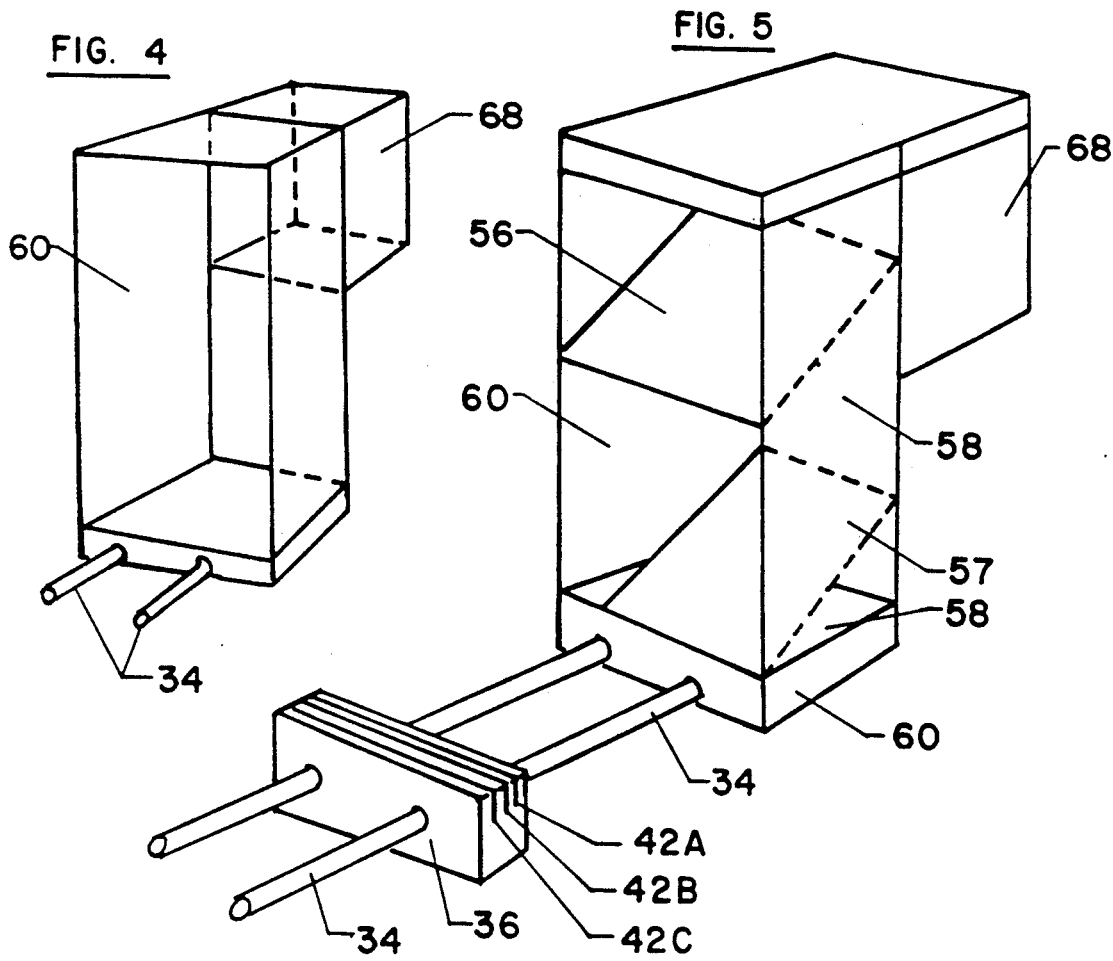

MAT SELECTION DEVICE

BACKGROUND OF THE INVENTION

1. Field of the Invention

This invention relates to the placement of a decorative and protective border on two-dimensional works of art. This process is called matting and the border is called the mat.

The safest way to permanently display a work of art on paper is to mat it and place it in a frame protected with a sheet of glass.

Matting serves two purposes, one esthetic, the other protective. Esthetically, a mat adds a color and design element in the form of a border to the picture. It also protects a painting by providing a breathing space between it and the glass.

The choice of color of the mat is of utmost importance. A well chosen mat complements a picture and relates it harmoniously to the local environment. A picture can be affected adversely by a poorly chosen mat.

The present method of choosing a mat does not serve the usual patron well. Mat and frame shops do not provide full sample mats to aid in the selection process. They provide instead partial corner mats to be placed at the corner of the picture to be matted (FIG. 6). Full mats (FIG. 7) are not provided. The patron can not actually see his picture fully trial matted. He must make a decision of how the picture will look on the basis of partial corner mats (FIG. 6).

Pictures brought to be matted are of many different sizes. Mats are usually made of cardboard products, fabrics, cork, or other materials. Mats of large size are flexible, floppy, and unwieldy to use. If a shop provided full mats in all ranges of size and color it would require a large inventory, greater storage area and greater countertop space. The actual process of sorting out different color mats for a patron to use would be difficult and time consuming. In the usual double matting (FIG. 10B) capability the shop would have to double this inventory, and to have triple matting capability (FIG. 10C) the shop would have to triple this large inventory at increased expense.

The invention to be detailed makes it possible to visually select a full mat for any size picture with one size of approximately 4.5×5 inch outer dimension mats for triple matting capability.

These small mats are easily used, handled, sorted, stored, separated and interchanged. They will permit the patron to see his picture of any size completely bordered by a single, double or triple colored mat (FIG. 11). This preview will help insure a suitable choice of the final mat.

Further objects and advantages of my invention will become apparent from a consideration of the drawings and ensuing description of it.

2. Description of the Prior art

The most closely related patents that we have found date back to the use of the stereoscope or stereo-opticon. They are U.S. Pat. Nos.:

1,194,057—Aug. 8, 1916—J. J. Murphy
1,900,557—Mar. 7, 1933—G. A Holcombe
2,261,850—Nov. 4, 1941—B. W. Kelly
2,289,467—Jul. 14, 1942—B. L. Taylor
2,581,000—Jan. 1, 1952—J. C. Copeland
4,550,978—Nov. 5, 1985—Alvin A. Friedle None of these patents discloses my dual position mat selection device in which the viewing eyepiece is used to restrict the field of view to a holder containing a small sample mat which may be moved so as to fill the periphery of the visual field, and with the entire device then physically placed so that the illusion of a mat surrounding a picture is created and preserved.

SUMMARY OF THE INVENTION

The use of the mat selection device is designed to allow the user to see his picture of any size fully visually matted singly, doubly or triply in colors of his choice. He will see his picture visually matted before it is actually matted.

The present method of selecting a mat does not permit the usual patron to achieve the best presentation of a work of art. In present practice only partial corner mats are provided. The patron is called upon to mentally visualize what his finished matted picture will look like. The guesswork entailed often leads to poor mat selection. This partial mat process is tedious to both patron and mat shop employee and often leads to unsatisfactory or not completely satisfactory end results.

The method proposed utilizing the mat selection device has many advantages:

1. It allows the user visual trial and error full matting of his picture.
2. It gives the user a straightforward direct means of seeing how his finished matted picture will look.
3. The process is simple. It requires only a small inventory of small colored mats which are easily used, interchanged and stored.
4. It decreases the time now taken for mat selection. It thus enhances the efficient use of the mat shop employee's time and that of the patron.
5. The mat selection device is of simple construction. It is portable and can be hand held. It will take up little shop space. It will benefit the speed and result of the mat selection process.
6. Any size of picture can be visually matted by small mats by advancing or retracting the mat carrier or by increasing or decreasing the distance of the device from the picture.
7. The size of the mats and/or their apertures can be varied to fit the special picture size needs of different matting establishments.
8. A method of visual framing as well as matting pictures is described using a picture frame mat.
9. A grid drawing mat can be utilized by an artist as an aid to easier drawing of a scene.

BRIEF DESCRIPTION OF THE DRAWING

Drawing Figures

In drawings closely related figures have the same number but different alphabetic suffixes.

FIG. 3A shows a side view of the mat selection device with the direct vision monocular eyepiece aimed at a picture to be matted.

FIG. 3B shows a side view of the mat selection device with parallel plane mirrors inclined at 45 degrees to the axis of its housing aimed at a picture to be matted.

FIG. 4 is a perspective view of the housing and eyepiece of the plane mirrors.

FIG. 5 shows a perspective view of the mat selection device utilizing parallel plane mirrors.

Numeral Reference

20—picture to be matted
22—partial corner mat
24—full mat
26—observer's eye
28—monocular rectangular eyepiece
30—vertical section of frame supporting monocular eyepiece
32—horizontal base of frame supporting runners
34—runners
36—moveable triple mat carrier
38—end piece
39—picture frame mat
40A—outer mat
40B—middle mat
40C—inner mat
41B—aperture of middle mat
41C—aperture of inner mat
42A—slot for outer mat
42B—slot for middle mat
42C—slot for inner mat
43—grid drawing mat
44—field of picture visualized
46—field of mat visualized
48—top of picture
49—top of picture image in plane mirror
50—bottom of picture
51—bottom of picture image in plane mirror
52—top of visually matted area
54—bottom of visually matted area
56—upper plane mirror facing observer
57—lower plane mirror facing mat and picture
58—45 degree angle
60—housing of parallel plane mirrors
62—visualized image of mat seen by observer in upper plane mirror
64—image of picture seen by observer in upper plane mirror
68—binocular viewing eyepiece

DESCRIPTION OF THE PREFERRED EMBODIMENTS

Figure 1:
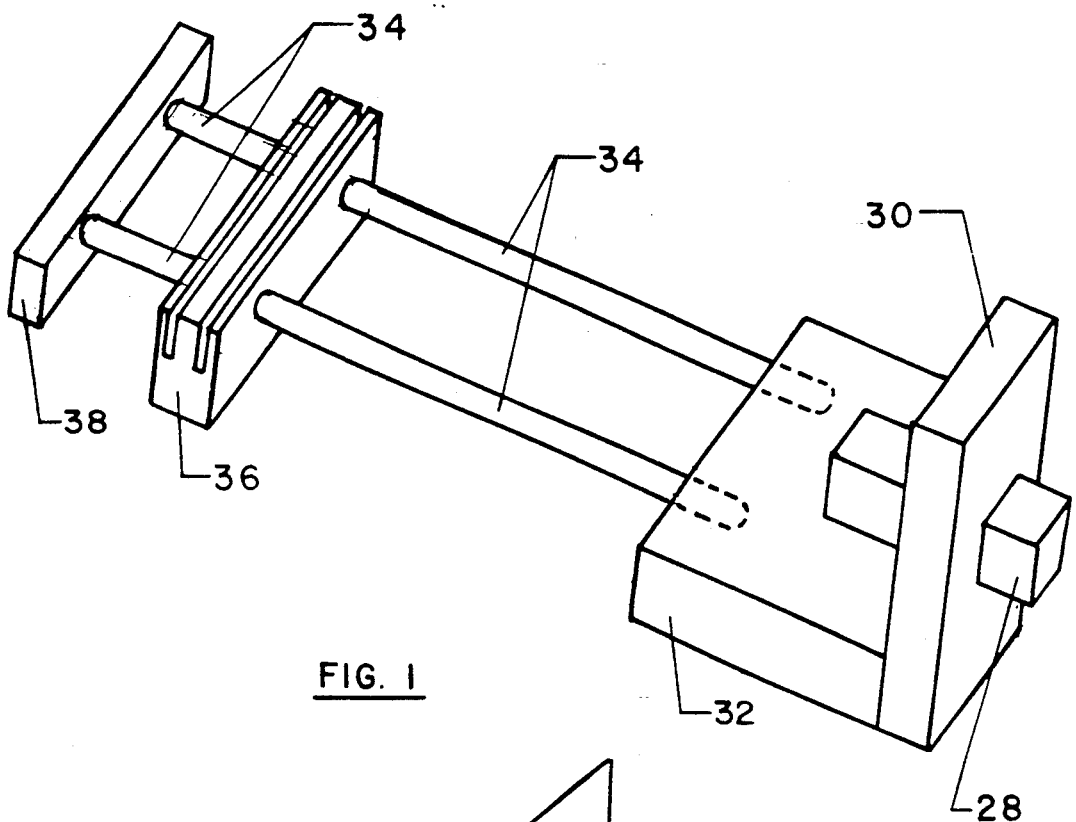
FIG. 1 shows a perspective view of the structure and parts of the mat selection device.

FIG. 1 shows a perspective view of the mat selection device.

An L shaped frame whose vertical posterior section 30 supports a rectangular, monocular, elongate eyepiece 28, which traverses the vertical posterior section 30 so that its optical axis is at right angles to the vertical section. The eyepiece 28 begins proximal to the posterior face of the vertical section, and projects distal to its anterior face.

The horizontal base section 32 at right angles to the vertical section 30 supports two elongate runners 34 which are solidly embedded in the forward portion of its base.

The runners 34 extend outward from the horizontal base 32 in a line with the optical axis of the eyepiece 28.

Figure 2:
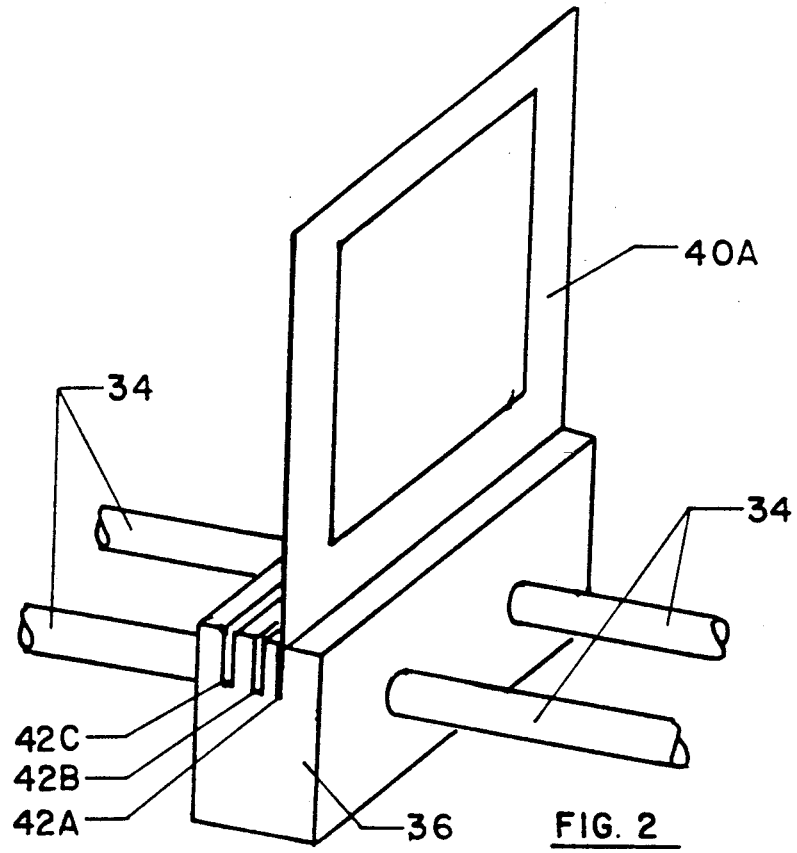
FIG. 2 shows a perspective view of the moveable triple mat carrier with a single mat in its slot.
Figure 6:
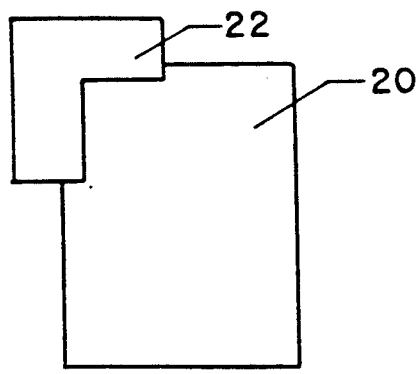
FIG. 6 shows a picture with a partial corner mat.
Figure 7:
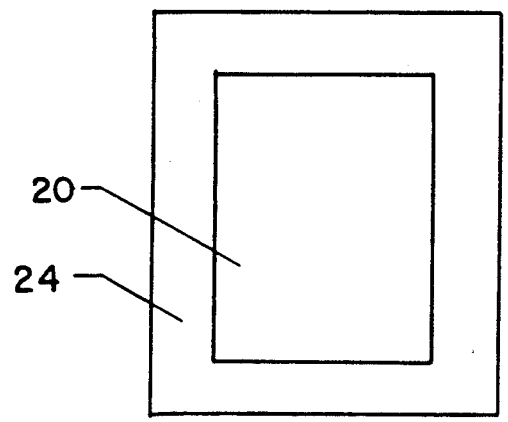
FIG. 7 shows a picture with a full mat.

FIG. 1 and FIG. 2 show a triple mat carrier 36 which is freely moveable and slidable on the runners 34 by virtue of two transverse holes in the base of the mat carrier through which the runners pass. They extend to a horizontal end piece 38 which steadies and terminates the outer end of the runners 34.

The mat carrier 36 (FIG. 1) can be moved manually from the horizontal base 32 to the end piece 38.

Figure 13:
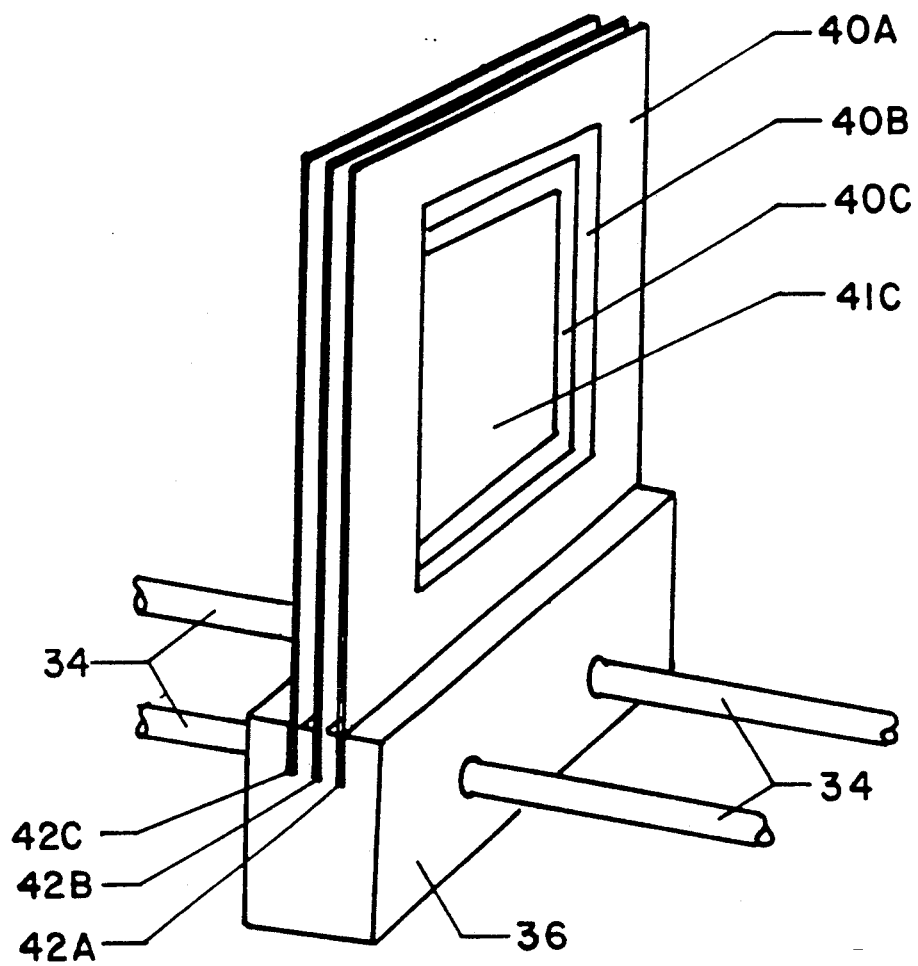
FIG. 13 shows a triple mat carrier with outer, middle, and inner mats in their respective slots.

FIG. 2 is a perspective view showing the triple mat carrier 36 in detail. The carrier has on its upper surface three slots 42A, 42B, and 42C placed longitudinally to accommodate the mats 40A, 40B, and 40C (FIG. 2 and FIG. 13). These mats 40A, 40B, and 40C are held in their longitudinal slots to face the optical axis of the eyepiece 28.

The mats 40A, 40B, and 40C are usually made of colored cardboard products or cardboard products faced with fabric or other materials as cork. The mats are of a wide and varied range of color and value.

All sample mats used in the mat selection device are of the same outer dimensions. The aperture of the outer mat 40A is larger than that of the middle mat 40B and the aperture of the middle mat is larger than that of the inner mat 40C (FIGS. 10A, 10B, and 10C and FIG. 11).

Figure 14:
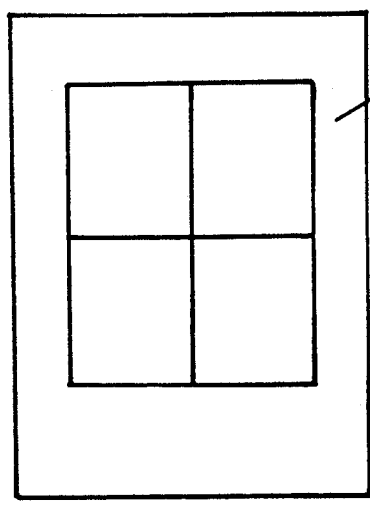
FIG. 14 shows a grid drawing mat.
Figure 15:
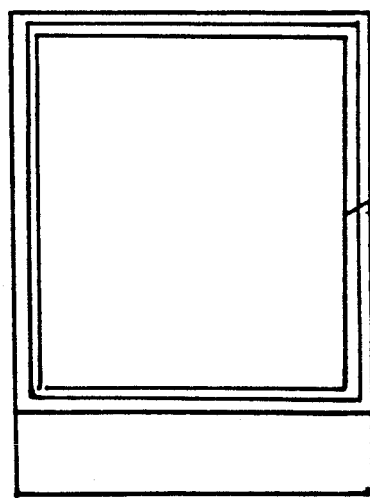
FIG. 15 shows a frame mat.

FIG. 15 shows a frame mat 39 of the same outer dimension as 40A, 40B, and 40C but with a larger aperture than that of the outer mat 40A and a narrower border which is colored, embossed or otherwise designed to simulate a picture frame. FIG. 14 shows a grid drawing mat of the same outer dimension as those of all of the above noted mats. Its aperture is of the same size as that of mat 40A and is bisected vertically and transversely by fine divisors fixed at each side of the mat.

Figure 16:
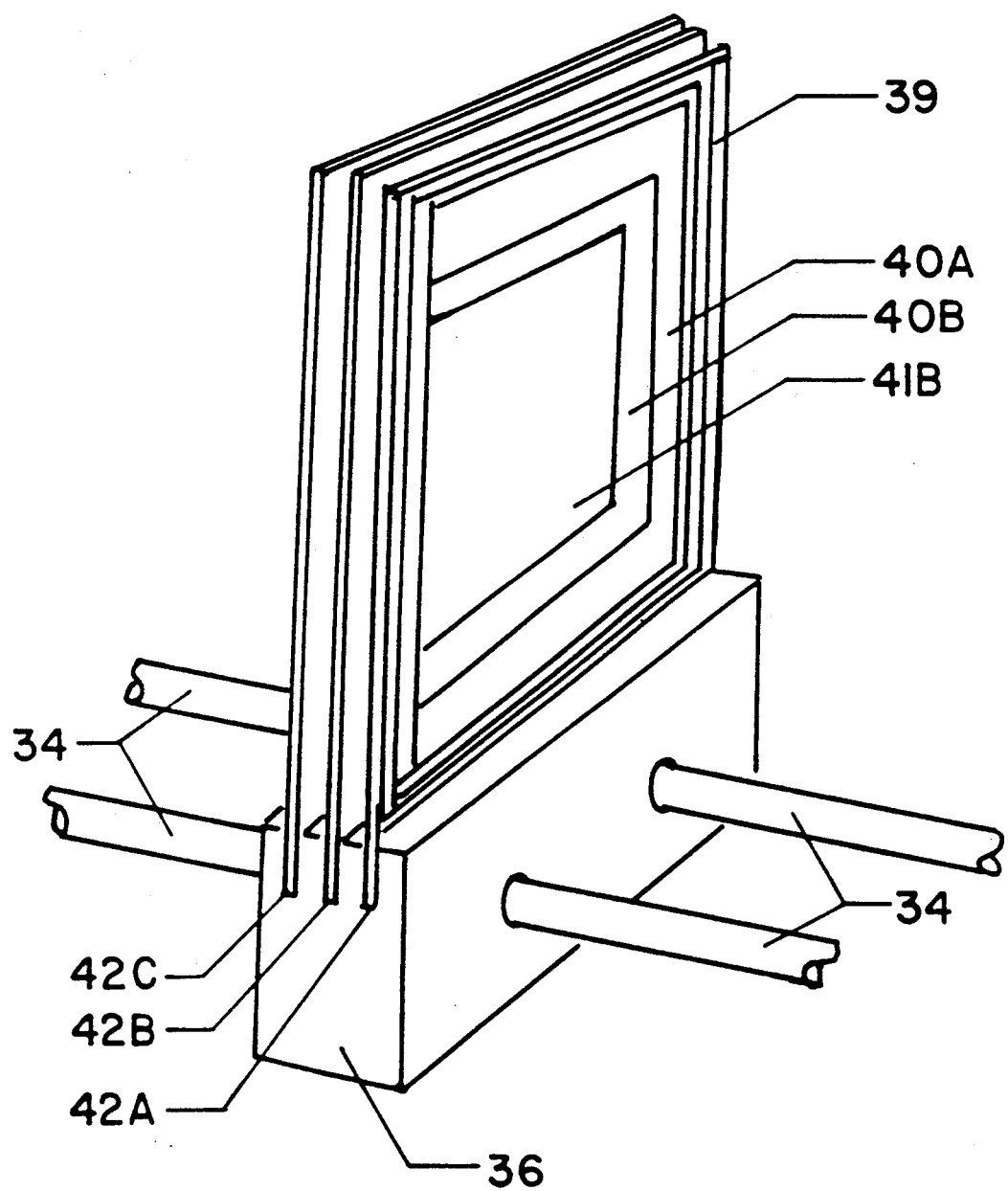
FIG. 16 shows a frame mat in the outer slot of the mat carrier with an outer mat in the next slot and a middle mat in the last slot.

FIG. 13 shows the triple mat carrier with three mats in place. FIG. 16 shows the triple mat carrier with a frame mat 39 in the first slot 42A and the outer and middle mats moved back to slots 42B and 42C respectively for picture frame and double mat selection.

Figure 8A:
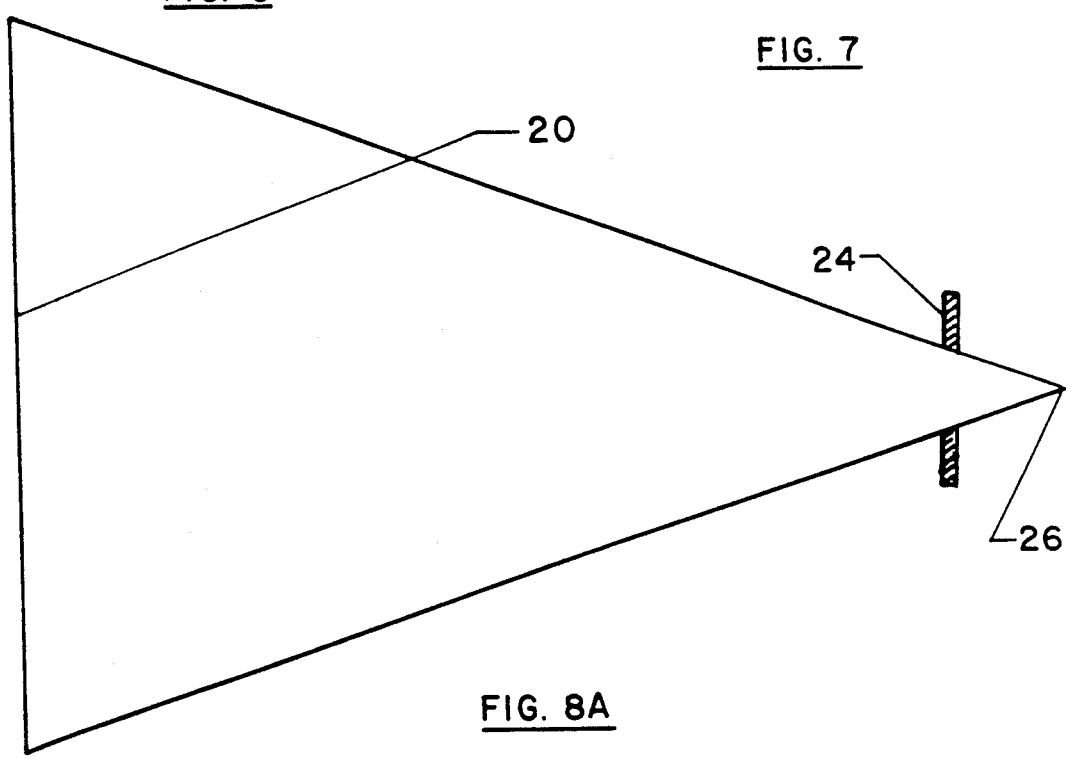
FIG. 8A shows the cone of vision with a mat aperture distant from eyepiece.
Figure 8B:
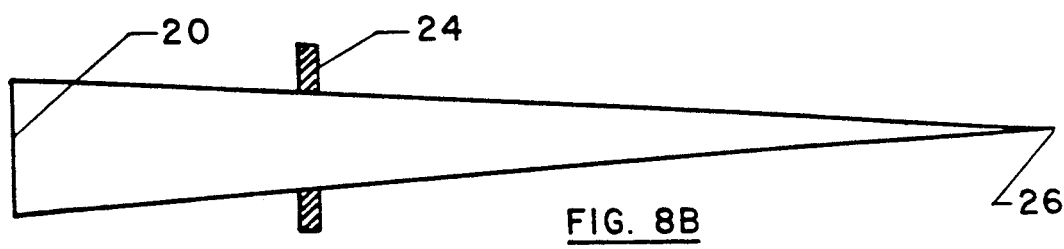
Figure 9A:
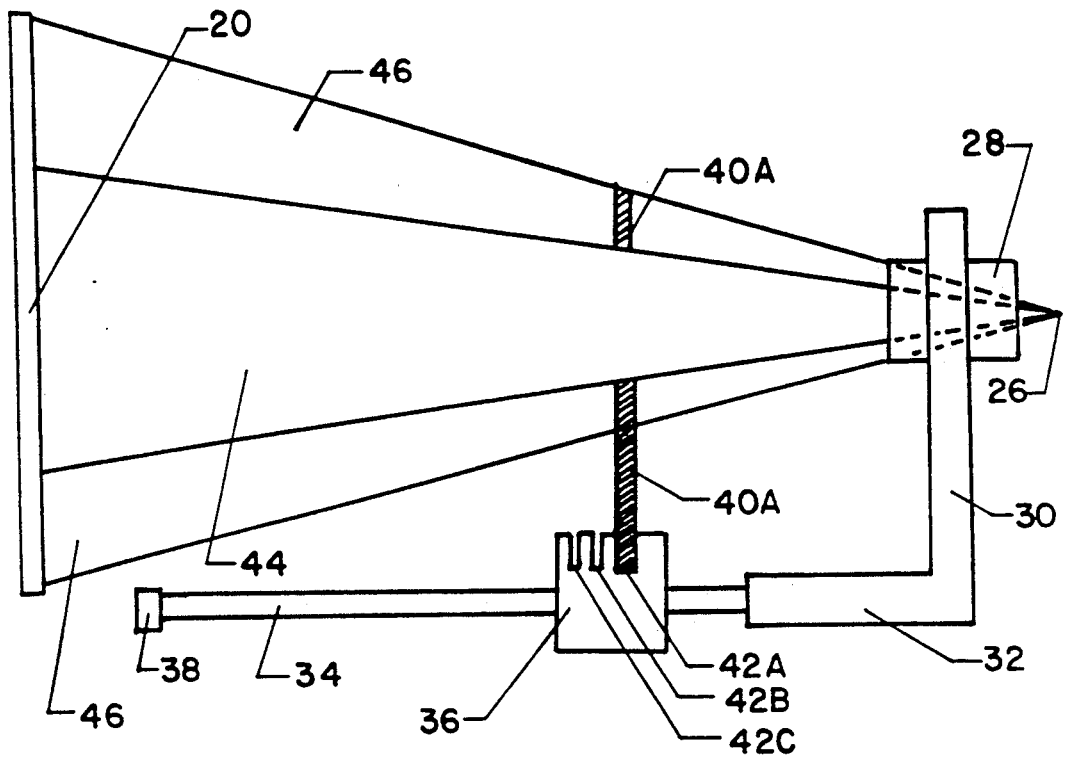
FIG. 9A and 9B show the changes in size of the visually matted picture as the carrier with a mat is retracted and advanced.
Figure 9B:
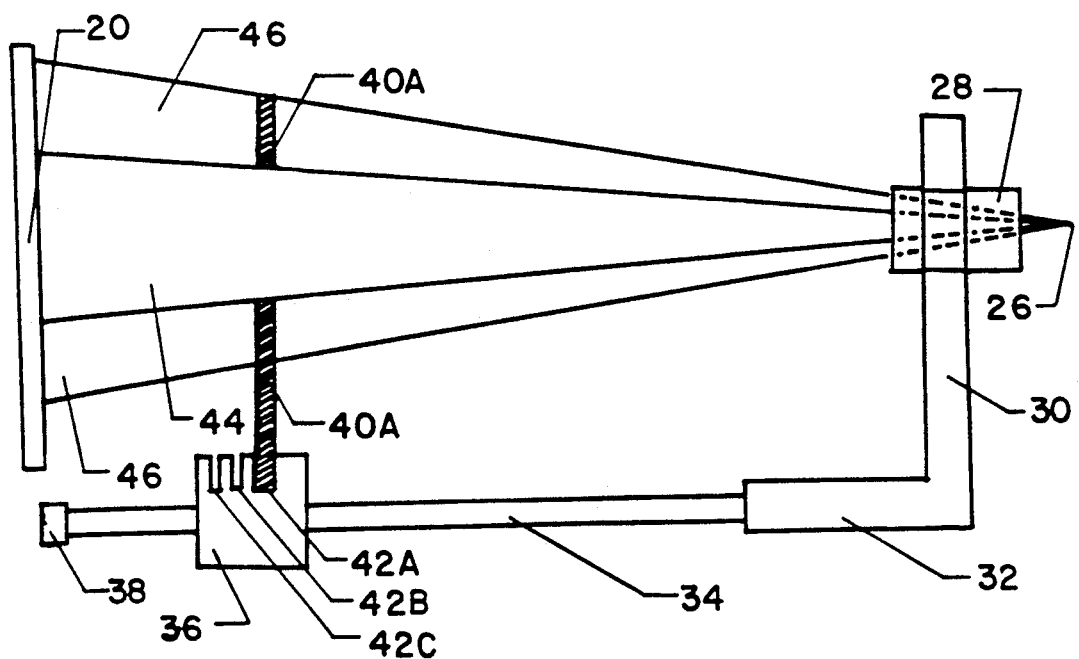

FIGS. 8A and 8B show that the field of vision or size of picture 20 seen through a mat aperture will vary inversely with the distance of the mat from the observer's eye 26. FIGS. 9A and 9B show the change in size of visually matted pictures as mat carrier 36 is advanced and retracted.

Figure 11:
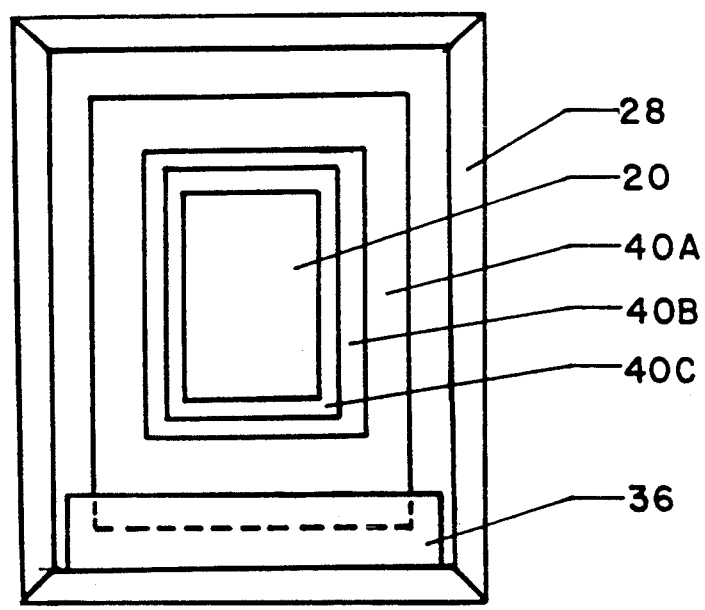
FIG. 11 shows a direct view of a visually triple matted picture as seen through the rectangular monocular eyepiece.

The foregoing description of the basic unit of the mat selection device (FIGS. 3A, 9A and 9B) allows a direct, monocular visual perception of a picture 20 enclosed in a mat 40A and triply matted (FIG. 11).

The mat selection device may be made of wood, metal, plastic or any product of suitable rigid composition.

Utilizing the same basic unit (FIG. 1) of an end piece 38, runners 34, triple mat carrier 36, an alternate means of visually selecting a mat can be done with parallel plane mirrors in a housing (FIGS. 4 and 5) substituting for the L shaped frame and rectangular monocular eyepiece. A binocular as well as monocular image can be obtained by this means.

Figure 12A:
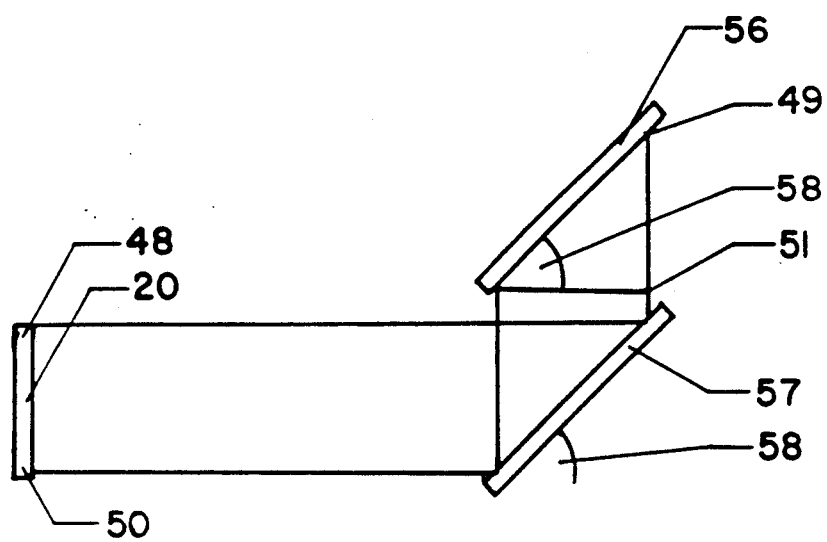
FIG. 12A is a side view showing how plane parallel mirrors inclined at 45 degrees reflect the image of a picture.
Figure 12B:
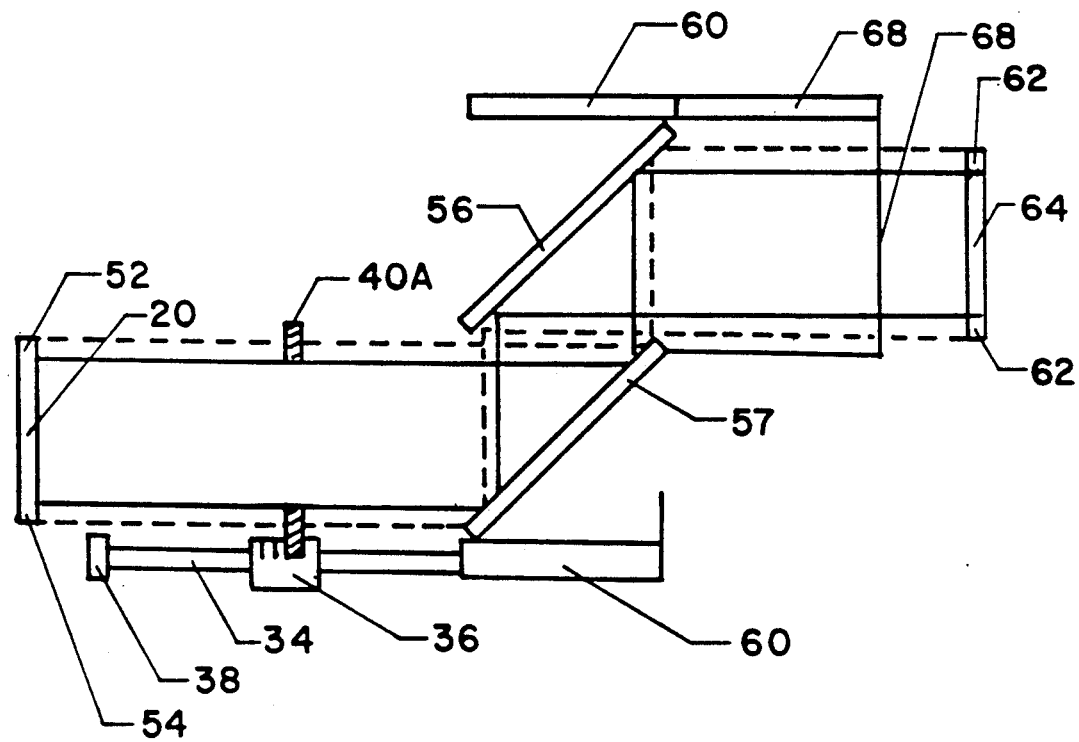
FIG. 12B shows a side view of the mat selection device with parallel plane mirrors reflecting the image of a mat and picture.

FIG. 5 is a perspective view in which the L shaped frame of the posterior vertical section 30 with eyepiece 28 and horizontal base runner support 32 of FIG. 1 is replaced by a rectangular upright housing 60 of FIG. 4 comprising two lateral facing sides, a top piece and a base section in the front of which the runners 34 are solidly embedded. The upper posterior half of the top and sides of the housing 60 project backwards toward the observer and has a base piece to create a rearward projecting binocular eyepiece 68. The housing 60 contains two parallel plane mirrors 56 and 57, their reflecting surfaces facing each other inclined at 45 degrees to the long axis of the housing. The upper mirror 56 faces backwards through the eyepiece 68 to the observer. The lower mirror 57 faces forward in the same direction as the runners 34. FIG. 3B shows the lower mirror 57 faces the mat 40A and picture 20. The upper mirror 56 faces the observer through the eyepiece 68. FIG. 12A is a side view showing how parallel plane mirrors 56, 57 inclined at 45 degrees will reflect the image of a picture 20 seen by the lower mirror 57. FIG. 12B shows a side view of the mat selection device utilizing the parallel plane mirrors to reflect the image of the mat 40A and picture 20 in the lower plane mirror 57 to the upper plane mirror 56 in which the image of the mat 62 and picture 64 is seen by the observer.

Therefore there are two structures, each utilizing the basic unit of runners 34, triple mat carrier 36 and end piece 38 and mats 40A, 40B, and 40C.

FIG. 3A shows the monocular rectangular eyepiece 28, vertical eyepiece support 30, horizontal base runner support 32 as a direct monocular viewing unit.

FIG. 3B shows parallel plane mirrors 56, 57 in a housing 60 with a posterior facing binocular rectangular viewing eyepiece 68 as an indirect image producer for monocular or binocular viewing.

FIG. 14 shows a grid drawing mat whose outer dimension is the same as those of mats 40A, 40B, 40C and 39. The mat's aperture is bisected transversely and vertically by fine divisors.

Operation

In a well lighted area the picture to be matted 20 of FIGS. 3A and 3B is placed flat against a designated vertical partition or wall and kept in place by clips, pins, narrow edge frame or any other suitable means.

The monocular mat selection device of FIG. 1 with a single mat 40A (FIGS. 2 and 9A) in place in the triple mat carrier 36 is held by the base 32 of the frame at a distance of approximately six feet from the picture. At this distance with the outer mat 40A approximately 4.5×5 inches in its outer measurements with an aperture of approximately 2.5×3 inches with the triple mat carrier moved close to the base runner support 32 of FIG. 9A, a picture approximately 26×30 inches can be visually matted. With the triple mat carrier 36 and mat 40A extended toward the end piece 38 (FIG. 9B) a smaller picture approximately 11×13 inches can be visually matted. If the picture is smaller than approximately 11—13 inches it can be visually matted by decreasing the distance between the device and the picture. If a picture is larger than 26×30 inches it can be visually matted by increasing the distance between it and the mat selection device. By the observer moving with the selection device nearer to or farther from the picture virtually any size large or small can be visually framed in a mat.

For vertical pictures the mat is placed with its long axis vertically in the slot 42A of the carrier 36. For horizontal pictures, the mat is placed horizontally.

The user holds the mat selection device (FIG. 1) and sights through the monocular, rectangular eyepiece 28 to center the picture 20 (FIG. 3A). Then by moving the mat carrier 36 forward if the picture is small (FIGS. 8B and 9B), a point will be arrived at where the outer mat 42A appears to border the picture.

Figure 10A:
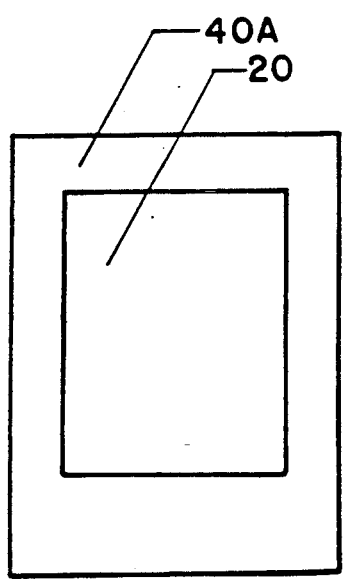
FIGS. 10A, 10B, and 10C show a picture with a single mat, double mat and triple mat.

At this point, the mat 40A may be replaced by trial and error or design with other colored mats until the user is satisfied and makes his choice of an outer mat that he feels is complementary and harmonious with his picture (FIG. 10A).

Figure 10B:
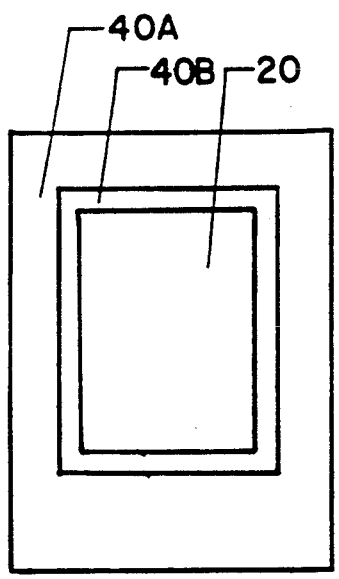
Figure 10C:
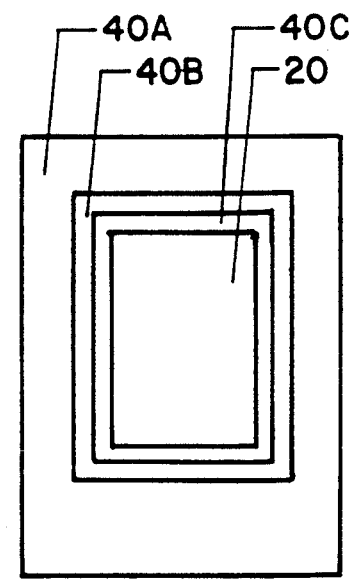

With the outer mat chosen, a second mat, middle mat 40B of FIG. 10B can be placed in slot 42B of the triple mat carrier of FIG. 13 so that the process of choosing a second mat harmonious to the outer mat 42A and to the picture 20 can be completed. The middle mat 40B is so designed that its aperture (FIG. 16) 41B is smaller than that of the outer mat 40A and, therefore, the observer sees, through the monocular eyepiece 28, the outer mat 40A, a border of the middle mat 40B and the picture 20 (FIG. 11).

If a third mat is desired then with the mt selection device with the previous two chosen mats 40A and 40B in their respective slots 42A and 42B of the mat carrier 36, the third inner mat 40C can be placed in slot 42C and chosen in the same manner as the previous two mats had been chosen, until a harmonious color scheme is achieved (FIG. 13).

The third or inner mat 40C is so constructed that when it is in its proper slot 42C in the mat carrier 36, its aperture 41C (FIG. 13) being smaller than those of mats 40A and 40B allows an inner border of this mat to be seen.

In the description of the structure of the mat selection device an alternate means of obtaining the illusion of visually matting a picture was described. It entails the use of parallel plane mirrors 56 and 57 (FIG. 5) to give a monocular or binocular image through the viewing eyepiece 68 (FIGS. 3B, 12A, and 12B). FIG. 12A shows the lines of reflection of a picture 20 to the lower mirror 57 which reflects the image to an upper parallel facing mirror 56. The image lines of direction are then reflected to the viewer who sees the image of the picture in the upper mirror 56. FIG. 12B shows the lines of reflection of both a picture and a bordering mat 40A in a mat carrier 36. The lines of reflection are passed from the lower plane mirror 57 to the upper plane mirror 56 and then to the observer through the binocular eyepiece 68 of the housing 60. The observer sees the image of the matted picture in the upper mirror 56.

The process of matting a picture with the mat selection device with parallel plane mirrors is exactly the same as the process described for the mat selection device with the monocular eyepiece.

The use of the mat selection device with the plane mirrors permits the viewer to use it for monocular viewing by holding it by the base of the housing 60 (FIGS. 4 and 5) as one did the mat selection device with the monocular eyepiece.

In addition the user may set the mat selection device (FIG. 5) on a suitable support or counter focused on the picture to be matted, and he may then step back and view the process and end result (FIG. 11) with binocular vision.

FIG. 15 shows a picture frame mat 39 which has the same outer dimensions as the other mats but its aperture is larger than that of the outer mat 40A and its narrower border is embossed or colored or designed to simulate a picture frame. FIG. 16 shows that by placing frame mat 39 in slot 42A, outer mat 40A in the next slot 42B and the last mat in slot 42C, one can then by use of the moveable mat carrier fill the periphery of the visual field of the observer with an outer picture frame mat and outer and middle colored mats. With the entire device aimed at the picture the illusion of a doubly matted picture with a picture frame is created. In this instance the double colored mats would be chosen first, and then frame mats of different color or design would be interchanged until a suitable harmonious frame for the doubly matted picture was obtained and chosen.

In shops where the usual size of picture to be matted is larger than the field of view using the aforementioned 4.5×5 inch mats with approximately 2.5×3 inch apertures, the sets of sample mats may be made larger with larger apertures to accommodate the shop's usual size of larger pictures at approximately six feet. When the average size picture to be matted is smaller than the field of vision provided by 4.5×5 mats, the sets of mats can be made of smaller size and aperture.

FIG. 14 shows a grid drawing mat 43 which can be used in the mat selection device with plane mirrors by an artist who is drawing a scene. The artist chooses the scene, aims the mat selection device at the scene, places the device on a suitable stand or tripod and inserts the grid drawing mat 43 in the carrier 36 so that the scene is framed in the mat and its form is broken into sections for easier drawing by the cross fine divisors which bisect eh mat vertically and transversely. The artist is able to stand back and with binocular vision see the image of the scene in the top mirror 56 (FIG. 12B) and refer to it as he draws.

I claim:

1. A viewing device for visual mat selection comprising:
    a. a frame whose vertical posterior section supports an eyepiece which traverses said vertical posterior section so that its optical axis is at right angles to the vertical section;
    b. a horizontal base section which supports a plurality of elongate, parallel horizontal runners extending outward to a transverse end piece from said horizontal base section in line with the optical axis of said eyepiece; and
    c. a mat carrier slidably mounted on the runners in a direction perpendicular thereto, wherein the carrier has on its upper surface parallel slots in said direction to hold mats of different colors and aperture sizes facing the optical axis of said eyepiece, whereby the eyepiece is used to restrict a field of view to said mats supported by the carrier which may be moved proximally and distally so as to fill a periphery of the visual field, and with said viewing device manually held or physically placed to be aimed at a subject to be matted so that the illusion of a mat surrounding the subject is created and preserved.

2. The viewing device of claim 1 wherein said eyepiece is rectangular.

3. Said eyepiece of claim 2 wherein said eyepiece is rectangular.

4. The viewing device of claim 1 wherein the runners are round.

5. The viewing device of claim 1 wherein said mat carrier has transverse holes in its base through which the runners pass.

6. The viewing device of claim 1 wherein outer dimensions of the outer, middle and inner mats are the same.

7. The mats of claim 6 wherein the aperture of the outer mat is greater than that of the middle mat, and the aperture of the middle mat is greater than that of the inner mat.

8. The mats of claim 7 wherein a picture frame mat whose aperture is greater than that of the outer mat and whose narrower border is colored, embossed or otherwise designed to simulate a picture frame.

9. The viewing device of claim 1 wherein said viewing device is a means for selecting a mat as a decorative border for two dimensional works of art.

10. The viewing device of claim 1 wherein said viewing device is a means for selecting a mat as a decorative border for three dimensional works of art.

11. A viewing device for visual mat selection comprising:
    a. a rectangular, upright housing comprising two lateral sides, a top and a base, an upper posterior half of the housing extending backwards toward the observer with a bottom piece to form a rearward projecting rectangular binocular viewing eyepiece, the housing containing two, upper and lower, parallel plane mirrors inclined at 45 degrees to a vertical axis of the housing, the upper mirror facing posteriorly toward the eyepiece, the lower mirror facing forward, a forward portion of the base of said rectangular, upright housing supporting a plurality of elongate, rigid, parallel horizontal runners extending outward to a transverse end piece; and
    b. a mat carrier slidably mounted on the runners in a direction perpendicular thereto, wherein the carrier has on its upper surface parallel slots in said direction to hold mats of different colors and aperture sizes facing a forward aspect of the housing whereby the binocular eyepiece is used to restrict a field of view to upper mirrored images of said mats supported by the carrier which may be moved proximally or distally to fill the periphery of visual field, and with said viewing device manually held or physically placed to be aimed at a subject to be matted so that the illusion of a mat surrounding the subject is created and preserved.

12. The viewing device of claim 11 wherein the runners are round.

13. The viewing device of claim 11 wherein said mat carrier has transverse holes in its base through which the runners pass.

14. The viewing device of claim 11 wherein outer dimensions of the outer, middle and inner mats are the same.

15. The mats of claim 14 wherein the aperture of the outer mat is greater than that of the middle mat, and the aperture of the middle mat is greater than that of the inner mat.

16. The mats of claim 14 wherein a mat of the same outer dimension having its aperture subdivided into a grid pattern by fine divisors is inserted in one of the slots.

17. The viewing device of claim 11 wherein said viewing device is a means for selecting a mat as a decorative border for two dimensional works of art.

18. The viewing device of claim 11 wherein said viewing device is a means for selecting a mat as a decorative border for three dimensional works of art.

* * * * *